(12) United States Patent
Kloppenburg et al.

(10) Patent No.: US 8,846,837 B2
(45) Date of Patent: Sep. 30, 2014

(54) NEODYMIUM-CATALYZED POLYBUTADIENES

(71) Applicant: Lanxess Deutschland GmbH, Leverkusen (DE)

(72) Inventors: Heike Kloppenburg, Dusseldorf (DE); Norbert Steinhauser, Monheim (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 13/860,892

(22) Filed: Apr. 11, 2013

(65) Prior Publication Data

US 2013/0237669 A1    Sep. 12, 2013

Related U.S. Application Data

(63) Continuation of application No. 13/500,440, filed as application No. PCT/EP2010/065461 on Oct. 14, 2010, now abandoned.

(30) Foreign Application Priority Data

Oct. 16, 2009 (EP) .................... 09173297

(51) Int. Cl.
*C08F 4/52* (2006.01)
*C08F 36/06* (2006.01)
*C08F 136/06* (2006.01)
*B60C 1/00* (2006.01)
*C08K 3/04* (2006.01)
*C08L 55/02* (2006.01)
*C08L 9/00* (2006.01)

(52) U.S. Cl.
CPC .............. *C08F 136/06* (2013.01); *B60C 1/00* (2013.01); *C08K 3/04* (2013.01); *C08L 55/02* (2013.01); *Y10S 526/907* (2013.01)
USPC .......... 526/153; 526/164; 526/340.4; 526/907

(58) Field of Classification Search
USPC ............... 526/153, 164, 340.4, 907; 525/232
See application file for complete search history.

(56) References Cited

U.S. PATENT DOCUMENTS 5,905,125 A * 5/1999 Tsujimoto et al. ............ 526/144
2003/0187162 A1* 10/2003 Rachita et al. ................ 526/164

* cited by examiner

*Primary Examiner* — Fred M Teskin
(74) *Attorney, Agent, or Firm* — Jennifer R. Seng

(57) ABSTRACT

The invention relates to a high-molecular-weight, linear, neodymium-catalysed polybutadiene having a high proportion, >95%, of cis-1,4 units having a low proportion, <1%, of 1,2-vinyl content, and also having a small molar-mass-polydispersity index (MPI), characterized in that
    Mooney viscosity ($ML_{1+4}$ 100° C.) of the polybutadiene is from 70 to 90 and
    The molar-mass-polydispersity index of the polybutadiene is smaller than 10.

3 Claims, No Drawings

NEODYMIUM-CATALYZED POLYBUTADIENES

This application is a continuation of U.S. patent application Ser. No. 13/500,440 filed May 3, 2012 (now abandoned), a nationalized application of International Patent Application Serial No. PCT/EP2010/065461 filed Oct. 14, 2010, claiming priority to European Patent Application No. EP09173297.4 filed Oct. 16, 2009, all incorporated herein by reference.

The present invention relates to a high-molecular-weight, linear, neodymium-catalysed polybutadiene having a high proportion, >95%, of cis-1,4 units and having a low proportion, <1%, of vinyl units, and also having a small molar-mass-distribution index (MDI), and to processes for producing these and to use thereof.

Polybutadienes are used as important constituents of rubber mixtures in the tyre industry, and it is desirable here to improve final properties, for example to reduce rolling resistance and abrasion. Another application sector is provided by golf-ball cores or shoe soles, where high rebound resilience is a prime concern.

Polybutadienes having a high proportion of cis-1,4 units have been produced for a long time on a large industrial scale, and are used for producing tyres and other rubber products, and also for impact-modifying polystyrene.

The current method of achieving high proportions of cis-1,4 units is the almost exclusive use of catalysts based on compounds of the rare earths, these catalysts being described by way of example in EP-A1 0 011 184 and EP-B-A1 0 007 027.

It is known from the prior art that, among the group of the high-cis polybutadienes, specifically neodymium-catalysed polybutadienes have particularly advantageous properties in respect of rolling resistance, abrasion and rebound resilience.

The person skilled in the art is aware that production of polybutadienes with low polydispersity is achieved by using structurally defined single-site catalysts based on ally complexes of the rare earths, these being described by way of example in Macromolecular Chemistry and Physics, 2002 (203/7) 1029-1039.

The catalyst systems used play an important part in the production of polybutadienes.

By way of example, the neodymium catalyst used in industry is a Ziegler/Natta system, which is formed from a plurality of catalyst components. Formation of the catalyst mostly involves formation of differing catalyst centres, and these can be discerned in an at least bimodal molar-mass distribution within the polymer. The known 3 catalyst components in the Ziegler/Natta catalyst system, mostly composed of a neodymium source, a chloride source and an organoaluminium compound, are mixed in a very wide variety of ways under certain temperature conditions, and the catalyst system here is prepared, with or without an ageing process, for the polymerization reaction.

The prior art reveals a plurality of production processes for Ziegler/Natta catalyst systems used for producing polybutadienes.

EP 0 375 421 B1 describes a process for producing a catalyst for polymerizing butadiene, where an aluminium hydrocarbyl or aluminium hydrocarbyl hydride, neodymium neodecanoate or neodymium naphthenate, and a halogen source, are mixed in solution in a hydrocarbon (hexane) at a temperature of from −15° C. to −60° C., and the catalyst system here is aged for a period of at least 8 hours before it is used for the polymerization reaction. The ageing process is preferably carried at −20° C.

U.S. Pat. No. 5,686,371 discloses a process for polymerizing one or more conjugated dienes by forming the catalyst system via mixing of a salt of a rare earth, an organoaluminium compound and a silicon halide or organosilicon halide in the presence of a diene at a temperature of from 0 to 30° C. The catalyst is then aged at room temperature before it is used for the polymerization reaction.

WO 02/068484 describes a process in which the known catalyst components, as described above, are directly introduced at a temperature of from −20° C. to 80° C., without any prior preformation process, into a butadiene-hexane solution, and the polymerization reaction takes place in a continuous process.

EP 1 055 659 describes a process for producing neodymium neodecanoate with high water content, above 10 000 ppm, as catalyst constituent for the solution polymerization of butadiene, where the said neodymium decanoate is combined with an alkylaluminium compound or hydride derivatives thereof, preferably diisobutylaluminium hydride (DIBAH), at a temperature of from 0 to 18° C. tert-Butyl chloride, as chloride source, is added at room temperature. The ageing process lasts for 30 minutes at the same temperature, before these materials are used for the polymerization reaction.

EP 0 076 535 likewise describes the production of a neodymium catalyst, where the known catalyst components are combined at a temperature of 80° C. tert-Butyl chloride is used as chlorine component. Ageing is mentioned, without any explicit statement of the ageing conditions.

EP 0 127 236 is likewise known from the prior art, and here the catalyst is produced via mixing of neodymium oxides, neodymium alcoholates and carboxylates with an organometallic halide, and also with an organic compound, at a temperature of from 20° C. to 25° C. It is also possible to carry out the mixing of the said 4 components at from 50° C. to 80° C. In this variant, the mixture is cooled to from 20 to 25° C., and then DIBAH is added. Ageing is not mentioned.

EP 1 176 157 B1 discloses a process for producing polybutadienes with reduced solution viscosity/Mooney viscosity ratio, where a preformation process is used during catalyst production. Here, the neodymium versatate is first mixed with DIBAH and isoprene at 50° C., and the said mixture is then cooled to 5° C., and then ethylaluminium sesquichloride (EASC) is added. The ageing period, at a temperature of from 10 to −80° C., can be from a plurality of minutes to a plurality of days. Comonomers, an example being a bisdiene, are added during the polymerization reaction in order to increase the degree of branching of the polymer and also therefore to obtain the very narrow solution viscosity/Mooney viscosity ratio. By virtue of the coupling by way of the bisdiene, the resultant branched polymer has at least 4 free chain ends per molecule, whereas linear molecules possess only 2 chain ends.

The number of chain ends within the polymer has a positive correlation with energy dissipation. As the number of free chain ends increases, the amount of energy dissipation via the polymer increases. However, as the amount of energy dissipated by the polymer decreases, rolling resistance decreases and the rebound resilience of the polymer improves, for example. Accordingly, the final properties of a linear polymer having only 2 chain ends per molecule are always better than those of a branched polymer, for identical molar mass.

Polymers having high molar mass are moreover preferable to polymers having low molar mass.

It is known that the number-average molar masses $M_n$ of commercially available polybutadienes are normally from 150 000 to 400 000 g/mol. The actual molar-mass distribution of the polymer is mostly shown in a GPC curve and extends over a very large region, which mostly extends well beyond a 10-fold difference.

Number-average molar masses Mn below 100 000 g/mol are particularly disadvantageous, since statistically, because of their small molar mass, they give poor binding into the polymer network, thus additionally impairing energy absorption, where this results from an increased level of free movement of the entire polymer chain.

In contrast, number-average molar masses Mn above 1 000 000 g/mol exponentially increase the solution viscosity of the polymer; the solubility of the polymer is therefore reduced. A disadvantage of high molar masses is therefore that cost-effective production of the said polymers becomes more difficult.

This is because in the absence of the said high-molecular-weight fractions within the polymer the amount of deposit on the walls of the reactor is reduced, i.e. less gel is formed, and reactor operating time can therefore be longer. Maintenance and cleaning of the reactors is therefore minimized, and this saves time and expense.

It is known that commercially produced polymers have statistical molar-mass distribution, the breadth of the molar-mass distribution being influenced by the catalyst-production process.

It was therefore the object according to the invention to provide a linear polybutadiene of high molecular weight which by virtue of low solution viscosity can provide an easy production process in the polymerization reaction, while also having an advantageous effect on the service properties of the rubber by virtue of a polymer structure which is uniform, linear, and of high molecular weight.

A polybutadiene of the type mentioned in the introduction is proposed in order to achieve the object, its Mooney viscosity ($ML_{1+4}$ 100° C.) being from 70 to 90, and its molar-mass-distribution index (MDI) being <10.

It is preferable that these polybutadienes have been catalysed by neodymium-containing systems. Systems of this type are Ziegler-Natta catalysts based on neodymium compounds which are soluble in hydrocarbons.

The neodymium compound used particularly preferably comprises neodymium carboxylates or neodymium alcoholates, in particular neodymium neodecanoate, neodymium octanoate, neodymium naphthenate, neodymium 2,2-diethylhexanoate and/or neodymium 2,2-diethylheptanoate It is known that excellent properties in tyre mixtures, e.g. low rolling resistance, high rebound resilience or low tyre abrasion, are obtained by minimizing polydispersity (PDI). Polydispersity is generally determined by gel permeation chromatography (GPC); it is the quotient obtained by dividing weight-average molar mass Mw by number-average molar mass Mn, and therefore represents the breadth of molar-mass distribution.

Broad molar-mass distribution is seen in good processing behaviour of the rubber and rubber mixtures, and this is seen inter alia in relatively low mixture viscosity, relatively small mixing time, and relatively low extrusion temperatures. However, there is an adverse effect on the property profile of the tyre.

Low polydispersity accordingly has the opposite effect on the processing behaviour of the abovementioned polybutadiene.

However, it has been found that the PDI index does not provide an adequate description of the actual properties of the polymer. In particular, no information is provided about the marginal regions of the molar-mass distribution, since the PDI merely provides a quotient calculated from the weight-average and number-average molar masses.

The molar-mass-distribution index (MDI) has therefore been introduced according to the invention, and is determined from gel permeation chromatography; it is the quotient obtained by dividing Mw (90%) by Mw (10%), and therefore describes the final property of the polymer. A small MDI, <10, means that the molar-mass distribution of the polymer is very narrow, and therefore that a uniform network structure can be formed.

The polybutadiene according to the invention therefore has the desired excellent properties in tyre mixtures.

The 1,4-cis content of the polybutadiene according to the invention is >95%, preferably >96%, and its 1,2-vinyl content is <1%, preferably <0.8%, particularly preferably <0.7%.

The solution viscosity (RT, 5.43%, toluene) of the polybutadiene according to the invention is preferably from 350 to 630 mPas, with preference from 400 to 580 mPas.

It is moreover preferable that the branching index (BD of the polybutadiene according to the invention is from 5 to 7. The BI is the quotient obtained by dividing solution viscosity by Mooney viscosity. It is known that, for polymers of identical structure, solution viscosity increases proportionally as Mooney viscosity increases. If the increase is subproportional, i.e. if BI is smaller than 5, solution viscosity is reduced by polymer branching, and this reduces the linearity of the polymer and increases the undesired number of free chain ends. Any superproportional increase, i.e. BI greater than 7, is mostly brought about by an increased number of very high-molecular-weight polymer chains, and makes production of the polymer more difficult.

The Mooney relaxation of the polybutadiene according to the invention is moreover preferably smaller than 6% after 30 sec. Mooney relaxation is brought about by slippage of the polymer chains after dynamic stressing of the polymer after the end of the Mooney measurement process, and indicates the linearity of the polymer.

The molar-mass distribution of the polybutadiene according to the invention is Mw 90%<1 000 000 g/mol and Mw 10%>100 000 g/mol. This molar-mass distribution is ideal for the polybutadiene according to the invention, since, as described above, it provides easy production and at the same time guarantees the desired good final properties of the polymer.

The polybutadiene according to the invention not only has improved rolling resistance and increased rebound resilience, but also is easier to produce, because it is associated with less deposition on the walls of the reactor, and less gelling, and therefore longer operating time of the reactor. Maintenance of the reactors is thus minimized, and this saves time and expense.

The polybutadiene according to the invention has other advantages during the production process, during transport, and during storage and processing, and also has the characteristics required for use in golf balls or in tyre production.

A further invention is a process for producing the polybutadiene according to the invention, by carrying out the following steps:

1. modified catalyst production using a preformation process, with use of catalyst systems based on neodymium, composed of
    component A: an alcoholate or a carboxylate of neodymium, preferably neodymium versatate,
    component B: a dialkylaluminium hydride, preferably diisobutylaluminium hydride (DIBAH),
    component C: a trialkylaluminium compound, preferably tributylaluminium (TIBA), component D: a diene, preferably butadiene or isoprene, and component E: at least one organometallic halide, preferably ethylaluminium sesquichloride (EASC), where, in a first step, components A, B, C and D are firstly mixed at a temperature of from 0° C. to 80° C., preferably from 30° C. to 60° C., for a period of from 5 minutes to 10 hours, preferably from 20 minutes to 2 hours, and the mixture is then cooled to below −10° C., preferably to below −30° C., prior to addition of component E;

2. a process of preformation of the modified catalyst system at a temperature of from −30° C. to 80° C., preferably from 5° C. to 50° C., for a period of from 1 to 250 hours, preferably from 2 to 100 hours;

3. polymerization of the monomers at a temperature of from −20 to 150° C.

By conducting the process according to the invention, it was possible to form a catalyst system which is based on neodymium and which has ideal activity, and which leads to the desired abovementioned properties of the polymer. The final properties of the polymer and the cost-effectiveness of the production process are functions of the amount and mode of action of the catalyst constituents. If, for example, the amount of catalyst used is too small, although the molar mass rises, and the Mooney viscosity of the polymer therefore rises, there is a corresponding slowing of the reaction of the monomer, and this is undesirable for economic reasons.

It is surprising that the modification, namely the lowering of the temperature for mixing of catalyst components A to D prior to addition of the chloride source E, with the additional collaborative effect of catalyst DIBAH as component B, and TIBA as component C, permitted formation of a catalyst system which has ideal activity and which is decisive for obtaining the polybutadiene according to the invention, with the abovementioned properties.

It is preferable that component D is a monomer identical with that used for producing high-molecular-weight neodymium-catalysed polybutadienes. The presence of the diene during catalyst production is particularly important, since it permits formation of a stable catalyst complex. The solvent used can comprise hexane, cyclohexane, toluene, or a solvent mixture of the C6 fraction. It is equally possible to use other solvents.

The solvent can be added in pure form or in the form of solvents of the individual catalyst components. The amount of solvent depends on component A, where the concentration of component A with respect to the solvent is from 0.05 to 0.3 mol/L, preferably from 0.08 to 0.2 mol/L.

The molar ratio of component A to component B is from 1:1 to 1:100, preferably from 1:3 to 1:80 and particularly preferably from 1:3 to 1:50, the molar ratio of component A to component C is from 1:0.4 to 1:15, preferably from 1:0.5 to 1:8, the molar ratio of component A to component D is from 1:1 to 1:200, preferably from 1:2 to 1:100 and particularly preferably from 1:3 to 1:50, and the molar ratio of component A to component E is from 1:0.5 to 1:20, preferably from 1:0.7 to 1:10 and particularly preferably from 1:0.8 to 1:8.

The cooling temperature in step 1 of the modified catalyst production process is preferably −10° C. or −20° C., preferably −30° C., particularly preferably −60° C. It is surprising that the said step has led to a catalyst system with which the polybutadiene according to the invention can be produced.

The invention further provides rubber mixtures comprising a polybutadiene according to the invention.

After the catalyst system has been preformed, the polymerization reaction is carried out in organic solvents. These solvents must be inert in relation to the catalyst system used. By way of example, aromatic, aliphatic and cycloaliphatic hydrocarbons are suitable, examples being benzene, toluene, pentane, n-hexane, isohexane, heptane and cyclohexane.

The polymerization reaction can be carried out either continuously or batchwise.

The polymerization reaction is carried out at a temperature of from −20 to 150° C., preferably from 0 to 120° C.

In one usual embodiment, the catalyst composed of components A, B, C, D and E is added to a mixture of 100 parts by weight of solvent with from 5 to 50 parts by weight, preferably from 8 to 30 parts by weight, of monomer.

Once the desired conversion has been reached, the catalyst is deactivated via addition of small amounts of, for example, water, carboxylic acids or alcohols.

Usual amounts of usual stabilizers can be added to the polymer solution, prior to work-up. Examples of stabilizers used are sterically hindered phenols or aromatic amines or phosphites, e.g. 2,6-di-tert-butyl-4,5-methylphenol.

The polymers are isolated via evaporation to concentrate the polymer solution, via precipitation by a non-solvent, such as methanol, ethanol, or acetone, or preferably via steam-distillation of the solvent.

After the steam-stripping process, water is removed by using suitable sieving assemblies or suitable assemblies comprising screws, examples being expeller screws and expander screws, or by using a fluidized-bed dryer.

The usual processes are used for drying, for example in a drying cabinet or in a screw-conveyer dryer.

The polybutadienes according to the invention can be used alone, in a blend with aromatic or aliphatic oils, or in a mixture with other rubbers. Suitable additional rubbers for producing rubber vulcanizates are not only natural rubber but also synthetic rubbers. Examples of preferred synthetic rubbers are described, in W. Hofmann, Kautschuktechnologie [Rubber Technology], Gentner Verlag, Stuttgart 1980 and I. Franta, Elastomers and Rubber Compounding Materials, Elsevier, Amsterdam 1989. They encompass inter alia BR—conventional polybutadiene ABR—butadiene/C1-C4-alkyl acrylate copolymers CR—polychloroprene IR—polyisoprene SBR—styrene/butadiene copolymers having styrene contents of from 1 to 60% by weight, preferably from 20 to 50% by weight IIR—isobutylene/isoprene copolymers NBR—butadiene/acrylonitrile copolymers having acrylonitrile contents of from 5 to 60% by weight, preferably from 10 to 40% by weight HNBR—partially hydrogenated or fully hydrogenated NBR rubber EPDM—ethylene/propylene/diene copolymers and mixtures of the said rubbers. Materials of interest for the production of motor vehicle tyres are in particular natural rubber, emulsion SBR, and also solution SBR rubbers with glass transition temperature above −50° C., which may, if appropriate, have modification by silyl ethers or by other functional groups, as described in EP-A-0 447 066, polybutadiene rubber having high 1,4-cis content (>90%), produced by using catalysts based on Ni, Co, Ti or Nd, and also polybutadiene rubber having vinyl content of from 0 to 75%, and also mixtures of these.

The invention further provides the rubber mixtures, which generally comprise from 5 to 300 parts by weight of an active or inert filler, e.g.

fine-particle silicas, produced by way of example via precipitation from solutions of silicates, or flame hydrolysis of silicon halides with specific surface areas of from 5 to 1000 m²/g, preferably from 20 to 400 m²/g (BET surface area) and with primary particle sizes of from 10 to 400 nm. The silicas can, if appropriate, also take the form of mixed oxides with other metal oxides, such as the oxides of Al, of Mg, of Ca, of Ba, of Zn, of Zr, or of Ti, synthetic silicates, such as aluminium silicate, or alkaline earth metal silicate, such as magnesium silicate or calcium silicate, with BET surface areas of from 20 to 400 m²/g and primary particle diameters of from 10 to 400 nm, natural silicates, such as kaolin and any other naturally occurring form of silica, glass fibres and glass-fibre products (mats, strands), or glass microbeads, metal oxides, such as zinc oxide, calcium oxide, magnesium oxide, aluminium oxide, metal carbonates, such as magnesium carbonate, calcium carbonate, zinc carbonate, metal hydroxides, e.g. aluminium hydroxide, magnesium hydroxide, metal salts, e.g. the zinc or magnesium salts of [alpha], [beta]-unsaturated fatty acids, e.g. acrylic or methacrylic acid, having from 3 to 8 carbon atoms, examples being zinc acrylate, zinc diacrylate, zinc methacrylate, zinc dimethacrylate, and mixtures thereof;

carbon blacks. The carbon blacks to be used here are those which are produced by lamp-black process, furnace-black process or gas-black process and which have BET surface areas of from 20 to 200 m²/g, examples being SAF, ISAF, HAF, FEF or GPF carbon blacks, rubber gels, in particular those based on polybutadiene, butadiene/styrene copolymers, butadiene/acrylonitrile copolymers and polychloroprene.

Particular preference is given to zinc diacrylates, and fine-particle silicas and carbon blacks.

The fillers mentioned can be used alone or in a mixture. In one particularly preferred embodiment, the rubber mixtures comprise, as fillers, a mixture of pale-coloured fillers, e.g. fine-particle silicas, and of carbon blacks, where the ratio of pale-coloured fillers to carbon blacks in the mixture is from 0.05 to 20, preferably from 0.1 to 10.

The form in which the fillers are added to the solution of the polybutadienes according to the invention is preferably that of solids or of slurry in water or in a solvent. The rubber solution can be produced in advance, but it is preferable that the solution deriving from the polymerization reaction is used directly. The solvent is then removed thermally or preferably with the aid of steam. The conditions for the said stripping process can easily be determined through preliminary experimentation.

Preference is further given to addition of the fillers to the solid polybutadiene according to the invention or to a mixture of rubbers, and incorporation by mixing in a known manner, e.g. by using a kneader.

The rubber mixtures according to the invention also comprise crosslinking agents, if appropriate. Crosslinking agents used can comprise sulphur or peroxides, and sulphur is particularly preferred here. The rubber mixtures according to the invention can comprise further rubber auxiliaries, such as reaction accelerators, antioxidants, heat stabilizers, light stabilizers, antiozonants, processing aids, plasticizers, tackifiers, blowing agents, dyes, pigments, waxes, extenders, organic acids, retarding agents, metal oxides, and also activators, e.g. triethanolamine, polyethylene glycol, hexanetriol, etc., these being known to the rubber industry.

In the preferred rubber mixtures using high-activity precipitated silicas, it is particularly advantageous to use additional filler activators. Preferred filler activators are sulphur-containing silyl ethers, in particular bis(trialkoxysilylalkyl) polysulphides, as described in DE-A-2,141,159 and DE-A-2,255,577, oligomeric and/or polymeric sulphur-containing silyl ethers of DE-A-4,435,311 and EP-A-0 670 347, and mercaptoalkyltrialkoxysilanes, in particular mercaptopropyltriethoxysilane and thiocyanatoalkyl silyl ether, e.g. as described in DE-A-195 44 469.

The amounts used of the rubber auxiliaries are usual amounts, and depend inter alia on the intended use. Examples of usual amounts are amounts of from 0.1 to 50% by weight, based on rubber.

The further blending of the rubbers with the other rubber auxiliary products mentioned, crosslinking agents and accelerators can be carried out in the usual way with the aid of suitable mixing assemblies, such as rolls, internal mixers and mixing extruders.

The compounding and vulcanization processes are described in more detail by way of example in Encyclopedia of Polymer Science and Engineering, Vol. 4, pp. 66 ff (compounding) and Vol. 17, pp. 666 ff (vulcanization).

The rubber mixtures according to the invention can be vulcanized at usual temperatures of from 100 to 200° C., preferably from 130 to 180° C. (if appropriate under pressure of from 10 to 200 bar).

The rubber mixtures according to the invention have excellent suitability for producing mouldings of any type.

Non-limiting examples of the said mouldings are O-rings, profiles, gaskets, membranes, tyres, tyre treads, damping elements and hoses.

Particular preference is given to various tyre components and tyre treads.

The rubber mixtures according to the invention are moreover suitable for impact modifying thermoplastics, in particular for polystyrene and styrene/acrylonitrile copolymers.

The rubber mixtures are particularly suitably used for golf balls, in particular golf-ball cores.

Examples are used below for further explanation of the invention.

EXAMPLES

Inventive Example 1

Polymerization of Butadiene with Catalyst-Preformation Process

Catalyst Production and Preformation Process:

4.26 mL (24 mmol) of diisobutylaluminium hydride, 3.03 mL (12 mmol) of triisobutylaluminium, 1.2 mL (12 mmol) of isoprene, and also 11.3 mL (3 mmol) of a 0.265 molar solution of neodymium versatate, were introduced in hexane into a dry, argon-inertized Schlenk vessel. The mixture was stirred at 50° C. for 90 min. The solution was then cooled with dry ice and when the temperature had reached −30° C. 8 mL (2 mmol) of a 0.25 molar solution of ethylaluminium sesquichloride in hexane were added. The preformed catalyst solution was allowed to stand overnight at room temperature and was then used for the polymerization reaction.

Polymerization Reaction:

595 g of hexane (dried over molecular sieve), and also 1.12 mL (1.12 mmol) of a 1 molar solution of triisobutylaluminium in hexane, 1.71 mL (0.18 mmol of Nd) of the catalyst solution described above, coming from the preformation process, and 124 g of butadiene were charged to a dry, argon-inertized 1.9 L glass autoclave. The mixture was heated to 65° C. and polymerized for 2 h, with stirring. 549 g of the viscous solution were then discharged, and 2 mL of methanol, and also 0.6 g of bis[3-<t>butyl-2-hydroxy-5-methylphenyl]methane were incorporated by stirring. The polymer was then dried in vacuo at 70° C. Weight of product after drying: 87 g Mooney viscosity (ML 1+4 at 100° C.): 81 MU; ML-Relax 30 sec: 5.4%

Solution viscosity (5.43% in toluene, at room temperature): 518 mPas; BI: 6.4

Molar-mass distribution: w(10%)=122 000 g/mol; w(90%)= 933 000 g/mol,

MDI: 7.6;

Mn: 255 000 g/mol; Mw: 487 000 g/mol.

Comparative Example 2

Polymerization without Catalyst-Preformation Process 555 g of hexane (dried over molecular sieve), 1.03 mL of a 1 molar solution of diisobutylaluminium hydride in hexane, 1.67 mL of a 0.618 molar solution of triisobutylaluminium in hexane, 3.45 mL of a 0.05 molar solution of neodymium versatate in hexane, 3.45 mL of a 0.05 molar solution of ethylaluminium sesquichioride in hexane, and 130 g of butadiene were charged to a dry, argon-inertized 1.9 L glass autoclave. The mixture was heated to 65° C. and polymerized for 2 h, with stirring. 568 g of the viscous solution were then discharged, and 2 mL of methanol, and also 0.6 g of bis[3-<t>butyl-2-hydroxy-5-methylphenyl]methane were incorporated by stirring. The polymer was then dried in vacuo at 70° C. Weight of product after drying: 96 g Mooney viscosity (ML 1+4 at 100° C.): 77 MU; ML-Relax 30 sec: 6.9%

Solution viscosity (5.43% in toluene, at room temperature): 725 mPas; BI: 9.4

Molar-mass distribution: w(10%)=85 000 g/mol; w(90%)= 1 070 000 g/mol,

MDI: 12.6;

Mn: 199 000 g/mol; Mw: 520 000 g/mol.

Comparative Example 3

Polymerization of Butadiene with Catalyst-Preformation Process, without TIBA

Catalyst Production and Preformation Process:

7.5 mL (42 mmol) of diisobutylaluminium hydride, 1.2 mL (12 mmol) of isoprene, and also 11.3 mL (3 mmol) of a 0.265 molar solution of neodymium versatate in hexane were introduced into a dry, argon-inertized Schlenk vessel. The mixture was stirred at 50° C. for 90 mm. It was then cooled to 5° C., and 8 mL (2 mmol) of a 0.25 molar solution of ethylaluminium sesquichloride in hexane were added. The catalyst solution coming from the preformation process was allowed to stand overnight at room temperature and was then used for the polymerization reaction.

Polymerization Reaction:

580 g of hexane (dried over molecular sieve), 1.68 mL of the catalyst solution described above, coming from the preformation process, and 120 g of butadiene were charged to a dry, argon-inertized 1.9 L glass autoclave. The mixture was heated to 65° C. and polymerized for 3 h, with stirring. 616 g of the viscous solution were then discharged, and 2 mL of methanol, and also 0.6 g of bis[3-<t>butyl-2-hydroxy-5-methylphenyl]methane were incorporated by stirring. The polymer was then dried in vacuo at 70° C. Weight of product after drying: 103 g Mooney viscosity (ML 1+4 at 100° C.): 44 MU; ML-Relax 30 sec: 5.2%

Solution viscosity (5.43% in toluene, at room temperature): 278 mPas; BI: 6.3

Molar-mass distribution: w(10%)=82 000 g/mol; w(90%)= 783 000 g/mol,

MDI: 9.7;

Mn: 279 000 g/mol; Mw: 387 000 g/mol.

Testing of Mixture

For production of a compounded material, in each case the polymer according to the invention from Inventive Example 1 and the polymer from Comparative Example 3 is mixed with various substances and vulcanized. The physical properties of the respective compounded material are then determined and compared.

The substances used for the mixture studies were as follows:

Corax N 236 carbon black from KMF Laborchemie Handels GmbH, Vivatec 500 oil from Hansen & Rosenthal; Zinkweiss Rotsiegel zinc oxide from Grillo Zinkoxid GmbH; EDENOR C 18 98-100 stearic acid from Cognis Deutschland GmbH; Vulkanox® 4020/LG and Vulkanox® HS/LG stabilizers, and also Vulkacit® CZ/C rubber chemicals from Lanxess Deutschland GmbH, Antilux 654 stabilizer and RHENOGRAN IS 60-75 sulphur from Rhein Chemie.

| Mixture constituents in phr* (g per 100 g of polymer): | Inventive Example 1 | Comparative Example 3 |
| --- | --- | --- |
| Inventive Example 1 | 100 | |
| Comparative Example 3 | | 100 |
| CORAX N 326 | 50 | 50 |
| VIVATEC 500 | 4 | 4 |
| EDENOR C 18 98-100 | 3 | 3 |
| VULKANOX 4020/LG | 2 | 2 |
| VULKANOX HS/LG | 3 | 3 |
| ZINKWEISS ROTSIEGEL | 2 | 2 |
| RESIN SP-1068 | 3 | 3 |
| ANTILUX 654 | 2 | 2 |
| VULKACIT CZ/EGC | 1.4 | 1.4 |
| RHENOGRAN IS 60-75 | 2.36 | 2.36 |

*phr = parts per hundred rubber

| Test | Unit | Inventive Example 1 | Comparative Example 3 |
| --- | --- | --- | --- |
| ML 1 + 4/100 | MU | 80 | 52 |
| Shore A hardness @ 60° C. | | 61 | 61 |
| Tensile test @ 23° C. | | | |
| S300 | MPa | 5.6 | 5.3 |
| D median | % | 526 | 514 |
| F median | MPa | 14.7 | 13.1 |
| Rebound resilience | | | |
| @ 23° C. | % | 62 | 55 |
| @ 60° C. | % | 65 | 63 |
| MTS Amplitude Sweep @ 60° C., 1 Hz | | | |
| G* (0.5%) 1st measurement | MPa | 2.05 | 2.26 |
| G* (0.5%) 2nd measurement | MPa | 1.98 | 2.13 |
| G* (0.5%) 3rd measurement | MPa | 1.97 | 2.12 |
| G* (15%) 1st measurement | MPa | 1.13 | 1.11 |
| G* (15%) 2nd measurement | MPa | 1.14 | 1.11 |
| G* (15%) 3rd measurement | MPa | 1.14 | 1.11 |
| tan d (max.) 1st measurement | | 0.16 | 0.181 |
| tan d (max.) 2nd measurement | | 0.16 | 0.181 |
| tan d (max.) 3rd measurement | | 0.16 | 0.180 |

The two compounded materials have identical hardness after vulcanization and are therefore directly comparable. In the tensile test, Inventive Example 1 exhibits improved dynamic properties in comparison with Comparative Example 3, discernible in greater tensile strength (F median) and greater tensile strain (D median).

Inventive Example 1 exhibits markedly improved rebound resilience when compared with Comparative Example 3. In the MTS test, Inventive Example 1 exhibits a smaller maximum value than Comparative Example 3 for the tangent delta (tan d) loss factor, this being a sign of reduced energy absorption by the polymer, and it is therefore possible to conclude that rolling resistance is markedly lower in inventive Example 1 than in Comparative Example 3.

What is claimed is:

1. A process for producing high-molecular-weight, neodymium-catalysed polybutadiene comprising:
   1) modifying the catalyst production using a preformation process, with use of catalyst systems based on neodymium, composed of
      component A: an alcoholate or a carboxylate of neodymium,
      component B: a dialkylaluminium hydride
      component C: a trialkylaluminium compound,
      component D: a diene, and
      component E: at least one organometallic halide
      where, in a first step, components A, B, C and D are first mixed at a temperature of from 0° C. to 80° C. for a period of from 5 minutes to 10 hours, and cooling the mixture to below −10° C. prior to addition of component E;
   2) preforming the modified catalyst system at a temperature of 0° C. to 80 C for a period of from 1 to 250 hours; and
   3) polymerizing component D at a temperature of from −20 to 150° C. to produce the polybutadiene,
   wherein the neodymium-catalysed polybutadiene comprises a high proportion, >95%, of cis-1,4 units and having a low proportion, <1%, of 1,2-vinyl content, and a small molar-mass-distribution index (MDI), characterized in that
      Mooney viscosity ($ML_{1+4}$ 100° C.) of the polybutadiene is from 70 to 90; and
      the molar-mass-distribution index of the polybutadiene is smaller than 10 and a Mw 90%<1 000 000 g/mol and Mw 10%>100 000 g/mol.

2. The process according to claim 1, characterized in that component D is a monomer identical with that used for producing high-molecular-weight neodymium-catalysed polybutadiene.

3. The process according to claim 2, characterized in that the molar ratio of component A to component B is from 1:1 to 1:100, the molar ratio of component A to component C is from 1:0.4 to 1:15, the molar ratio of component A to component D is from 1:1 to 1:200, and the molar ratio of component A to component E is from 1:0.5 to 1:20.

* * * * *